Feb. 28, 1961     R. E. GRILL     2,973,164
WING SEVERING DEVICE
Filed May 13, 1949
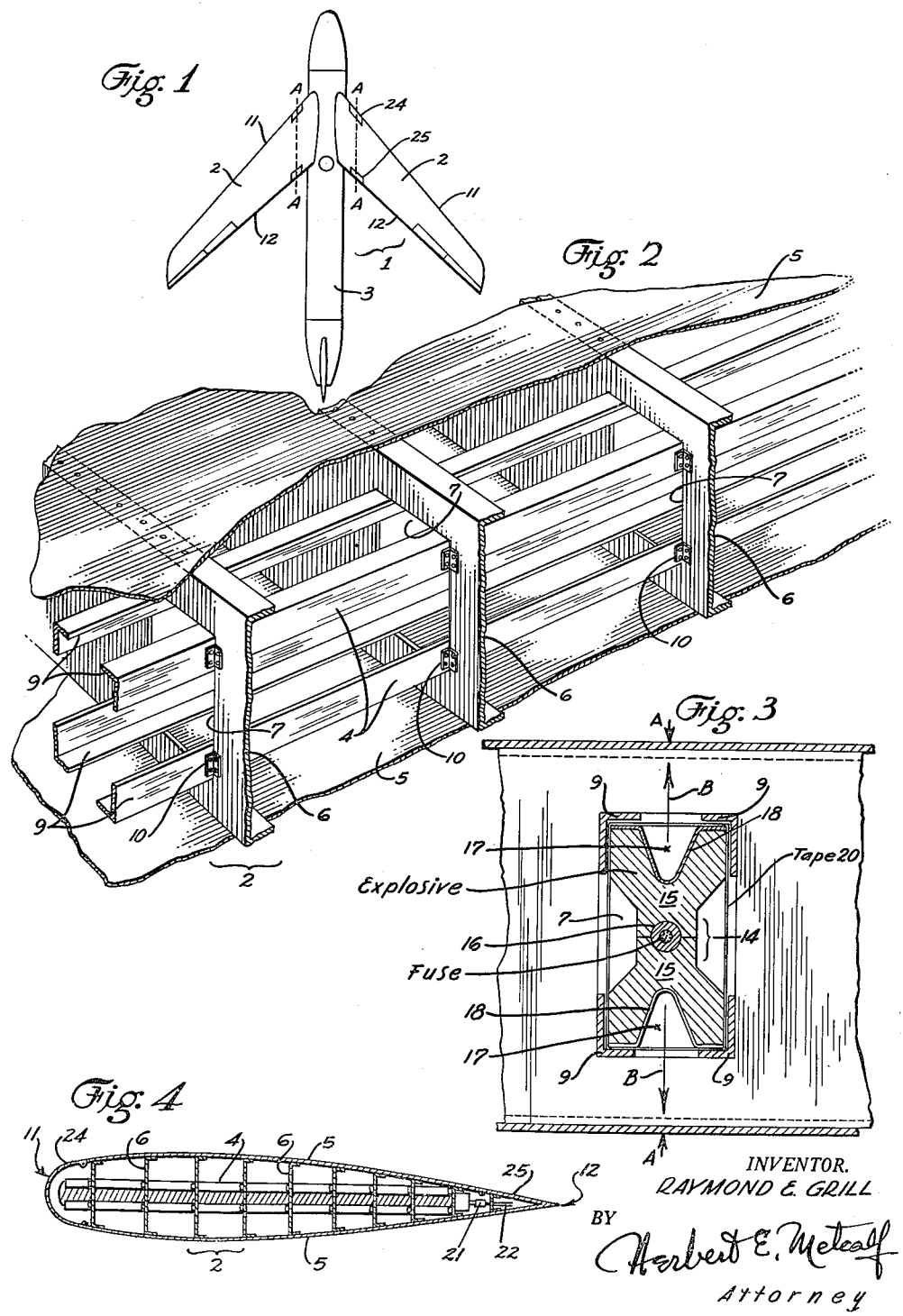
INVENTOR.
RAYMOND E. GRILL
BY
Herbert E. Metcalf
Attorney United States Patent Office 2,973,164
Patented Feb. 28, 1961

2,973,164

WING SEVERING DEVICE

Raymond E. Grill, Long Beach, Calif., assignor to Northrop Corporation, Hawthorne, Calif., a corporation of California Filed May 13, 1949, Ser. No. 93,143

5 Claims. (Cl. 244—14)

The present invention relates to aircraft such as guided missiles and more particularly to a means and method of severing elements such as wings from such aircraft.

When guided missiles are utilized for military purposes, such as for example, long range bombing, the missile is customarily in the form of heavier-than-air craft supported by wing elements, carrying an explosive warhead, and is equipped with some type of automatic guidance system. The missile may be engine or rocket propelled and of long or short range.

The trajectory of a ground-to-ground or air-to-ground missile will usually include mid-course guidance control; but as the target is approached, in order to increase the accuracy and speed with which the missile hits the target, it may be desirable to separate the wing elements from the remainder of the craft, so that the device will change in character from an aircraft to a bomb.

This is especially desirable since on approaching the target, as in a free fall, the missile can attain very high velocities which would be likely to cause structural failure of the wings anyway, so that a controlled separating of the wings, as in the embodiment of the present invention, results in a favorable timing and location of fracture.

While explosives have hitherto been utilized for severance of metallic elements, it must be remembered that military type guided missiles of the type herein discussed will carry a warhead of substantial size. In consequence, if explosives are to be used for severing the wings of a guided missile from the remainder thereof, fragmentation must be reduced to a minimum to avoid any possibility of detonation of the warhead. Furthermore, the weight of guided missiles is necessarily limited and if wing elements are to be severed by explosives, it should be done with a minimum of explosive charge.

It is an object of the present invention to explosively sever the wings of a guided missile from the remainder thereof with a minimum of explosive, and with a minimum amount of fragmentation.

In furtherance of the above objects, severance should not generally take place at the wing roots, or at the joint between the wing elements and the body of the missile, because at these locations the stresses are highest and are in consequence transmitted through heavy coupling members. Explosives utilized at these points would have to be excessive in weight and would cause excessive fragmentation.

However, when severance is to be made outboard of the wing root joints, it is essential that the severing explosion be of such a nature that a clean, predictable cut can be made, both through the wing spar elements and through the skin so that the wing stubs left attached to the body of the missile will be substantially alike on both sides of the missile.

Accordingly, it is a still further object of the present invention to provide a means and method of severing wing elements from the remainder of an aircraft that will provide a predictable cut and wherein the cut will be relatively clean.

In brief, the present invention includes the use of formed explosive charges exhibiting the "Monroe effect" with the cutting blasts directed to cut through the spars and skin of the wing elements across the wing elements, at a predetermined position, together with means for substantially instantaneously detonating the charges.

The invention may be more fully understood by reference to the drawings in which:

Figure 1 is a plan view of a guided missile, showing wing severance lines.

Figure 2 is a perspective view of a wing element, cut away to show an explosive rack.

Figure 3 is a view partly in section and partly in elevation of the explosive charge in position in a wing element.

Figure 4 is a sectional view through a wing element showing the rack charged with explosive.

A guided missile 1, as shown in Figure 1, for example, is provided with wing elements 2 and a body 3. As pointed out above, it is desirable in some instances to shear the wing elements from the missile to cause the missile to assume the form of a bomb. In accordance with the present invention, the severance is made by detonation of an explosive charge outboard of the wing element attachments to the body, along lines as indicated by the lines A—A in Figure 1.

In order that the explosive charge may be held rigidly in a position to shear the wing elements along lines A—A, each wing element as built is provided with an explosive rack 4 as shown in Figures 2, 3, and 4.

At lines A—A the wing elements comprise an outer airplane skin 5 supported by spanwise spars 6. The type of spar arrangement shown is for illustration only, as any type of spar construction desired can be used.

In any event, the spars 6 are provided with apertures 7 alined along line A—A in each wing element. The rack 4 is formed from four corner angle bars 9 fastened to the spars as by clips 10. Thus, at the corners of apertures 7, a rack is formed extending from near the leading edge 11 of the wing element, and terminating near the trailing edge 12 of the wing.

The explosive charge is placed in rack 4, and comprises a plurality of explosive blocks 14 as shown in Figure 3.

Each block 14 is formed from identical upper and lower half blocks 15 centrally abutting to surround a fuse 16 of, for example, "primacord" having an explosion rate of about 20,000 feet per second. The surface of each half block facing the airplane skin 5 is formed with a wedge shaped channel space 17 lined with a steel liner 18; on detonating the explosive blocks 14, the attending high temperature and pressure melts the steel liner 18 thereby providing a sharply defined cutting blast directed upwardly and downwardly (Monroe effect), caused by the contours of the wedge shaped channel spaces 17, as indicated by the arrows B in Figure 3. A preferred explosive is "pentolite."

The cutting blast is made continuous across the wing by assembling the half blocks vertically as shown in Figure 3, and also longitudinally to such a length as will extend from adjacent the leading edge 11 to adjacent the edge 12, and then binding the blocks together with a tape binding 20. Thus fuse 16 will extend through the entire charge. Preferably the explosive facing the leading edge 11 is also formed with channelled spaces and lined.

At the rear of the charge the fuse 16 projects beyond the charge to receive a detonator 21 exploded by electric current supplied through detonator wires 22, as is well known in the art.

Preferably the charge is assembled and taped outside the airplane, and is then placed in rack 4 through an opened leading edge panel 24, the charge sliding along corner angle bars 9 into place. The charge is then secured to the wing, the detonator wires 22 connected through a rear panel 25 to a timing mechanism such as may be carried in the missile, and the panels closed to make the missile ready for flight.

When exploded, as by timing devices carried in the missile, the cutting blasts shear both the skin and spars cleanly, with a minimum of fragmentation. The high velocity fuse insures practically instantaneous severance, and the danger of exploding the warhead is remote. By shaping the charge to obtain the desired Monroe effect, a minimum of explosive is required and the entire wing severance installation is thus made with a minimum of weight and fragmentation.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In combination, an aircraft having a body, wing elements attached to said body, laterally extending spars in said wing elements, an explosive charge inside of each wing element outboard of said body for severing said wing elements from said body, each of said charges comprising an explosive mass extending longitudinally of a wing element from adjacent the leading edge of said wing element through apertures in said spars to a point adjacent the trailing edge of said wing element, said charge having a peripheral channel therein shaped to direct a cutting blast through said spars and the outer covering of said element along predetermined lines to sever said wing element, said lines being substantially the same distance from said body in both wing elements, and means for simultaneously detonating said charges to sever said wing elements from body along said predetermined lines.

2. In combination, an aircraft having a body, a wing element attached to said body, said wing element including an outer skin and internal outwardly extending spars, an explosive charge within said wing element and extending from adjacent the leading edge of said wing to adjacent the trailing edge thereof, and passing through apertures in said spars, said charge having a peripheral channel therein opening outwardly to said skin, and to said spars at said apertures, said channel being shaped and lined to create a sharply defined outwardly directed cutting blast, and means for detonating said charge to sever said wing element.

3. Apparatus in accordance with claim 2 wherein said charge comprises a continuous plurality of upper and lower half blocks abutting centrally to surround a fuse and wherein said channel is formed in the upper and lower surfaces of each pair of abutting blocks, wherein said plurality of blocks are taped together to form said charge and wherein a detonator cap is attached to said fuse at the trailing edge end thereof.

4. Apparatus in accordance with claim 2 wherein said charge is unitary, wherein a charge holding rack is provided around the edges of said apertures, and wherein a movable panel is provided in the leading edge of said wing element for loading said charge into said wing element.

5. Apparatus in accordance with claim 2 wherein said charge is unitary, wherein a charge holding rack is provided around the edges of said apertures, and wherein a movable panel is provided in the leading edge of said wing element for loading said charge into said wing element, wherein said detonating means is electrically operated, and wherein a trailing edge panel is provided for connection of said detonating means to a timing system carried by said aircraft.

References Cited in the file of this patent

UNITED STATES PATENTS

| 1,672,163 | Krammer | June 5, 1928 |
| 2,375,423 | Lobelle | May 8, 1945 |
| 2,409,848 | Greulich | Oct. 22, 1946 |
| 2,415,814 | Davis et al. | Feb. 18, 1947 |
| 2,496,024 | Schwendler et al. | Jan. 31, 1950 |

FOREIGN PATENTS

| 618,617 | Great Britain | Feb. 24, 1949 |